Oct. 2, 1956 W. M. KAUFFMANN 2,764,963
CONTROL OF FUEL INTRODUCTION TO ENGINE CYLINDER
Filed Oct. 13, 1955. 2 Sheets-Sheet 1

WILLIAM M. KAUFFMANN
*INVENTOR.*
BY *Daniel W. Bobis*
*Atty*

Oct. 2, 1956 — W. M. KAUFFMANN — 2,764,963
CONTROL OF FUEL INTRODUCTION TO ENGINE CYLINDER
Filed Oct. 13, 1955 — 2 Sheets-Sheet 2

WILLIAM M. KAUFFMAN
INVENTOR.

United States Patent Office 2,764,963
Patented Oct. 2, 1956

2,764,963

CONTROL OF FUEL INTRODUCTION TO ENGINE CYLINDER

William M. Kauffmann, Hamburg, N. Y., assignor to Worthington Corporation, Harrison, N. J., a corporation of Delaware Application October 13, 1955, Serial No. 540,203

6 Claims. (Cl. 123—120)

The present invention relates to gas engines and more particularly to means for controlling the introduction of fuel to the engine cylinder.

In accordance with the present invention, a gaseous fuel injection valve is provided which acts to control the introduction of fuel to the engine cylinder. The injection valve is controlled by actuating means which operate the main inlet valve to the engine cylinder. The actuating means for the main inlet valve acts to move the inlet valve toward an opened position while moving the exhaust valve toward a closed position so that the inlet valve and exhaust valve are opened and closed at different time intervals during rotation of the engine crankshaft. However, there is an overlap in the timing of the opening and closing of the inlet and exhaust valves as the crank rotates so that there is a short period of crank travel at which the inlet valve is opened before the exhaust valve is closed. The inlet valve is opened before the exhaust valve is completely closed to allow clean air to be blown through the cylinder to remove the waste gases therein. To prevent the injection of gaseous fuel into the engine cylinder during this period of overlap so that the fuel is not wasted by merely blowing through the cylinder and out the exhaust valve, the present invention provides a gaseous fuel injection valve that can be moved with the main valve but will not discharge until the exhaust valve is completely closed.

The structure for accomplishing this result comprises a valve which acts to control the admission of gaseous fuel to the cylinder and which moves simultaneously with, or is operated by the actuating means for the main inlet valve to the cylinder. The valve head of this gaseous fuel injection valve is thickened or widened to form a piston-like element which is slidable in a combined valve head guide and cage whereby the actual opening or unseating of the gaseous injection valve is delayed until the piston-like valve head is moved into the cage to uncover slots communicating with a passage which in turn is in communication with the main inlet valve. The valve head has the further feature of a cone-type seat to prevent gas leaks in its closed position.

The invention will be better understood from the following description when considered in connection with the accompanying drawings forming a part thereof and in which.

Figure 1:
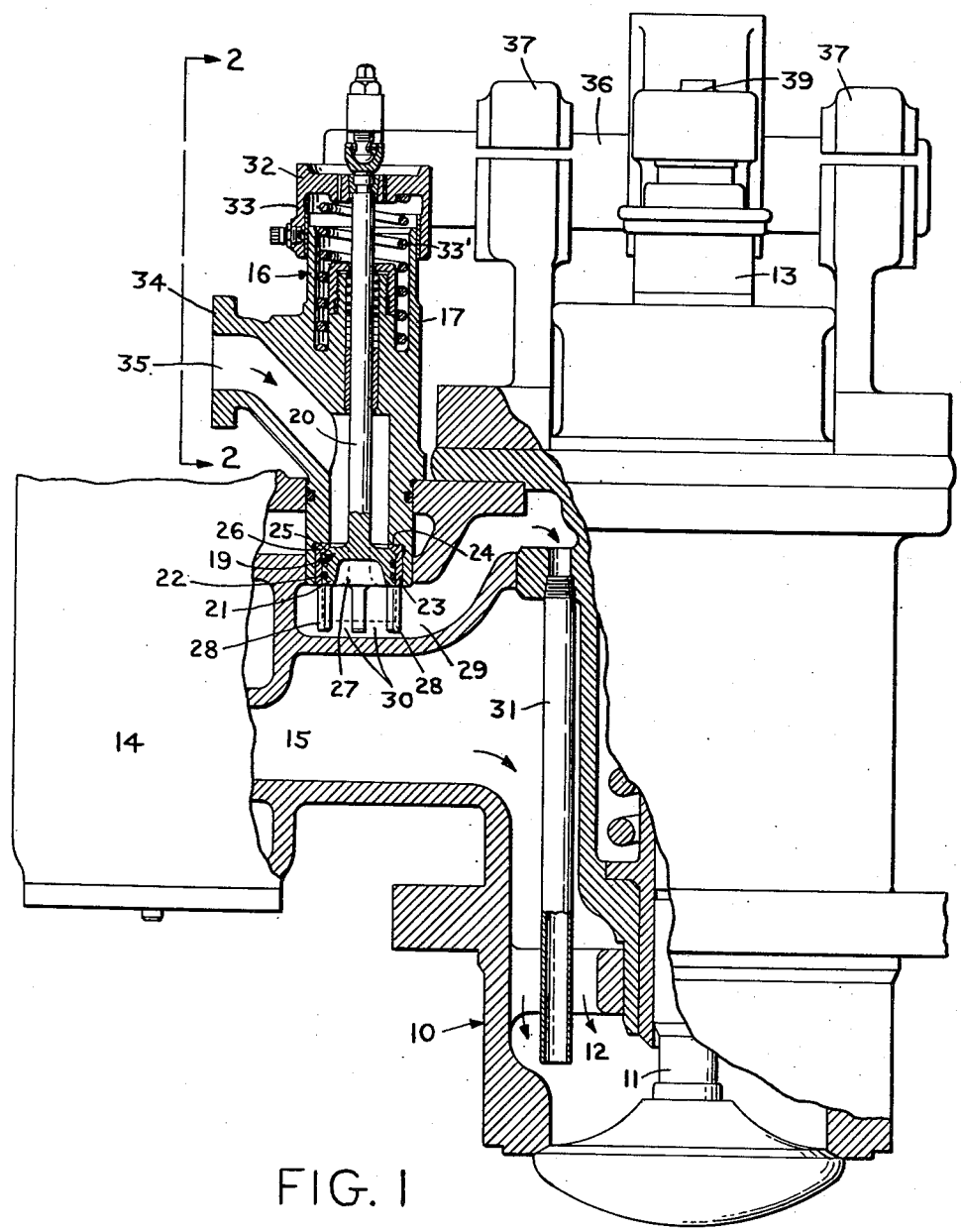
Figure 1 is a fragmentary view shown partly in section, of an inlet valve in a gas engine cylinder embodying the present invention.
Figure 2:
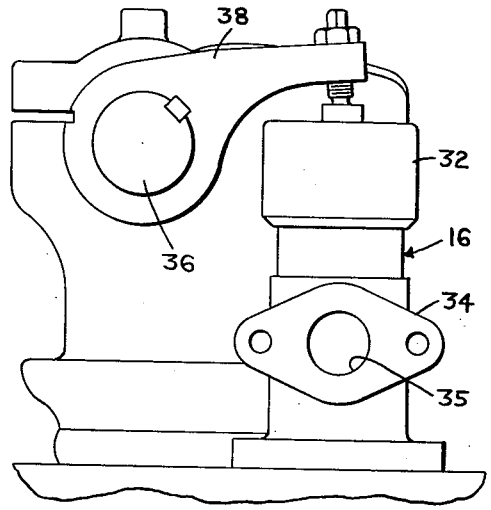
Figure 2 is a view taken on line 2—2 of Figure 1.

Referring to Figure 1, the reference numeral 10 designates a portion of the cylinder head of a gas engine in which is disposed an inlet valve 11 having a valve stem 13 and an inlet passage 12 for receiving compressed air from an air valve 14 through passage inlet opening 15. Air valve 14 communicates with a turbo-charger, not shown, which supplies air under pressure thereto. A gaseous fuel injector valve 16 extends into the cylinder head. Valve 16 is provided with a housing 17 in which is disposed a slidable valve head or piston member 19 having a piston rod or stem 20 connected thereto.

Piston member 19 comprises a substantially cylindrical sleeve disc 21 having piston rings 22 therein disposed for slidable movement within an annular insert member 23 positioned in a cylindrical countersink or recess 24 in the lower portion of the valve housing. The upper end of disc 21 has a cone-shaped rim 25 adapted to seat in a fluid tight relationship against a corresponding cone-shaped portion 26 disposed on the upper inner surface of insert 23 to prevent gas leaks therebetween when the valve is in a closed or seated position. The lower portion of the disc 21 is provided with a central or axial bore 27 therein and is coextensive with insert 23 so that in a closed position rim 25 is seated against portion 26 of insert 23 while the disc 21 is completely enclosed within the insert.

A plurality of circumferentially spaced, longitudinally extending fingers 28 are disposed on the lower end of insert 23 and extend into a gaseous fuel discharge passage 29 in the cylinder head to form slots 30 therebetween. Passage 29 is in communication with main inlet valve passage 12 through a pipe member 31 positioned in the passage 12.

The upper end of piston rod 20 extends above housing 17 and has fixed thereto a crosshead guide 32 having a depending cylindrical skirt 33 adapted to slidably engage the outer surface of the housing. A spring member 33′ is mounted on the piston rod 20 in the upper portion of the housing 17 and skirt 33 to provide a tension force therein to normally maintain the piston member in a seated or closed position.

A gaseous fuel supply conduit 34 having an inlet opening 35 in communication with housing 17 above piston member 19 is provided for supplying gaseous fuel to the engine cylinder from a source, not shown. A control shaft 36 mounted in bearing support members 37 fixed to the engine cylinder head is provided for controlling the opening and closing of valves 11 and 16. Shaft 36 is operatively connected to the engine crankshaft, not shown.

A valve lever 38 is fixed to shaft 36 and has its opposite end adapted to move piston rod 20 and valve disc 21 of injection valve 16 downwardly in the cylinder head into discharge passage 29 between fingers 28 therein to unseat or open the valve and supply fuel to main inlet valve 11. Main inlet valve 11 is also provided with an actuating lever 39 fixed to shaft 36 and adapted to actuate main valve stem 13 to move valve 11 toward an opened position simultaneously with valve 16.

Figure 3:
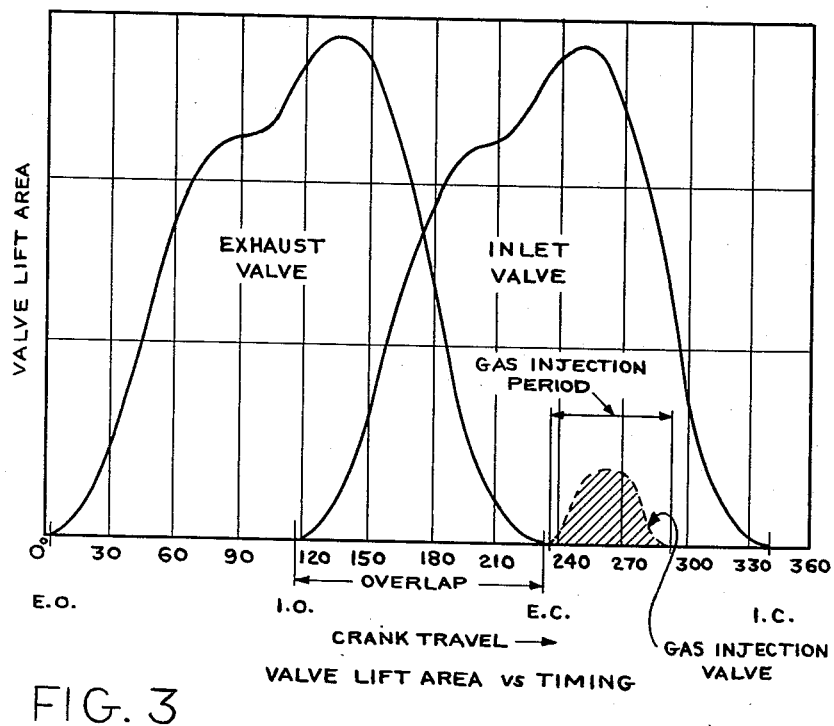
Figure 3 is a diagram illustrating the inlet, gas injection, and exhaust valve lift areas versus the crankshaft travel or timing for a gas engine embodying the present invention.

In the operation of a gas engine, when it is desired to inject gaseous fuel to the engine cylinder, the cylinder exhaust valve is closed and the inlet valve thereto is opened at approximately the proper time sequence during rotation of the crankshaft by actuating means operatively connected to the engine crankshaft. In the present invention, actuating means, not shown, act on control shaft 36, and valve levers 38 and 39 simultaneously move valve rod 20 of gas injection valve 16 and valve stem 13 of inlet valve 11 downwardly to move their respective valves toward an opened position. However, when there is an overlapping of the opening of inlet valve 11 before the exhaust valve is completely closed, as illustrated in the diagram of Figure 3, there is a short period of time during which gaseous fuel introduced into the engine cylinder will be blown through the exhaust valve and the fuel will be wasted. In the present invention, although the gas injection valve 16 and main inlet valve 11 are acted on simultaneously by the control means and both valves are moved toward an opened position, the delivery of gaseous fuel to the main inlet valve will be delayed until after the exhaust valve is fully closed, as shown in the diagram in Figure 3. This is accomplished by the positioning of the gas injection valve disc 21 in the insert member 23 disposed in the lower portion of the valve housing 17. Thus, when valve lever 38 is actuated by the control shaft and moves valve rod 20 connected to the valve disc 21 downwardly, the disc will slide downwardly in insert 23 and fingers 28 until its lower end is adjacent the lower end of fingers 28 before the valve is opened. The valve remains closed before this position is reached so that no gas is discharged to passage 29, since the outer surface of disc 21 is still in contact with the inner surface of insert 23 during this movement. This produces a time delayed action before the upper edge of the disc clears the lower edge of insert 23 to permit the passage of gas from the interior of housing 17 through slots 30 between fingers 28 and into passage 29. By this time the crankshaft (not shown) has traveled a sufficient distance so that the exhaust valve is completely closed, as illustrated in Figure 3, and the gaseous fuel thereafter passes through pipe 31 into inlet passage 12 of the inlet valve, after which it is introduced into the cylinder. Thus, the present invention prevents the blowing of fuel through the cylinder.

It will be understood that the invention is not to be limited to the specific construction or arrangement of parts shown but that they may be widely modified within the invention defined by the claims.

What is claimed is:

1. In combination, a main inlet valve for a gas engine, a gaseous fuel injection valve in communication with said inlet valve, actuating means for simultaneously moving said valves toward an opened position, said injection valve comprising a housing, a piston member slidably disposed in said housing, said actuating means adapted to move said piston out of said housing to open said injection valve whereby the opening of injection valve occurs after the opening of said inlet valve.

2. In combination, a main inlet valve for a gas engine, a gaseous fuel injection valve in communication with said inlet valve comprising a housing forming a valve seat, a piston member slidably disposed therein to form a valve disc adapted to seat against said housing when the valve is closed, and actuating means for simultaneously moving said valves toward an opened position, said actuating means adapted to move said piston member out of said housing before said injection valve opens to thereby delay the unseating of said injection valve until after said inlet valve is opened.

3. In combination, a main inlet valve for a gas engine, a gaseous fuel injection valve in communication with said inlet valve comprising a housing, said housing having a recess in the lower portion thereof, an annular member disposed in said recess to form a valve seat, a piston member comprising a substantially cylindrical sleeve disc slidably disposed in said annular member to form a valve disc adapted to seat against said annular member, a piston rod connected to said piston member, tension means mounted on said rod to normally maintain said piston member seated against said annular member, and actuating means for simultaneously moving said valves toward an opened position, said actuating means adapted to move said piston member clear of the lower edge of said annular member to delay the opening of said injection valve until said inlet valve is opened.

4. In combination, a main inlet valve for a gas engine, a gaseous fuel injection valve in communication with said inlet valve comprising a housing, said housing having a recess in the lower portion thereof, an annular member disposed in said recess to form a valve seat, the upper end of said member having a cone-shaped inner surface, a piston member comprising a substantially cylindrical sleeve disc slidably disposed in said annular member to form a valve disc adapted to seat against said annular member, the upper end of said piston member having a cone-shaped outer surface adapted to seat against the corresponding cone-shaped surface of said annular member, a piston rod connected to said piston member, tension means mounted on said rod to normally maintain the cone-shaped surface portion of said piston member seated against the corresponding cone-shaped surface of said annular member, and actuating means for simultaneously moving said valves toward an opened position, said actuating means adapted to move said piston member clear of the lower edge of said annular member to delay the opening of said injection valve until said inlet valve is opened.

5. In combination, a main inlet valve for a gas engine, a gaseous fuel injection valve in communication with said inlet valve comprising a housing, said housing having a recess in the lower portion thereof, an annular member disposed in said recess to form a valve seat, the lower portion of said member having a plurality of fingers disposed thereon, said fingers extending below said housing to provide slots therebetween, a piston member comprising a substantially cylindrical sleeve disc slidably disposed in said annular member to form a valve disc adapted to seat against said annular member, a piston rod connected to sid piston member, tension means mounted on said rod to normally maintain said piston member seated against said annular member, and actuating means for simultaneously moving said valves toward an opened position, said actuating means adapted to move said piston member between said fingers and clear of the lower edge of said annular member to delay the opening of said injection valve until said inlet valve is opened.

6. In combination, a main inlet valve for a gas engine, a gaseous fuel injection valve in communication with said inlet valve comprising a housing, said housing having a recess in the lower portion thereof, an annular member disposed in said recess to form a valve seat, the upper end of said member having a cone-shaped inner surface, the lower portion of said member having a plurality of fingers disposed thereon, said fingers extending below said housing to provide slots therebetween, a piston member comprising a substantially cylindrical sleeve disc slidably disposed in said annular member to form a valve disc adapted to seat against said annular member, the upper end of said piston member having a cone-shaped outer surface, a piston rod connected to said piston member and extending above said housing, a crosshead guide having a skirt slidably engaging the outer surface of said housing, said crosshead guide connected to the upper end of said piston rod, tension means mounted on said rod to normally maintain the cone-shaped surface portion of said piston member seated against the corresponding cone-shaped surface of said annular member, and actuating means for simultaneously moving said valves toward an opened position, said actuating means adapted to move said piston member between said fingers and clear of the lower edge of said annular member to delay the opening of said injection valve until said inlet valve is opened.

References Cited in the file of this patent

UNITED STATES PATENTS 962,214    Harrington _____ June 21, 1910